(No Model.)

B. A. BAXTER.
STOVE LID.

No. 260,826. Patented July 11, 1882.

WITNESSES:
Fred. G. Dieterich.
P. C. Dieterich.

INVENTOR.
B. A. Baxter,
by C. A. Snow & Co.
ATTORNEYS.

UNITED STATES PATENT OFFICE.

BERRY A. BAXTER, OF SALEM, OHIO.

STOVE-LID.

SPECIFICATION forming part of Letters Patent No. 260,826, dated July 11, 1882.

Application filed May 12, 1882. (No model.)

*To all whom it may concern:*

Be it known that I, BERRY A. BAXTER, of Salem, in the county of Columbiana and State of Ohio, have invented certain new and useful Improvements in Stove-Lids; and I do hereby declare that the following is a full, clear, and exact description thereof, which will enable others skilled in the art to which it appertains to make and use the same, reference being had to the accompanying drawings, which form a part of this specification.

This invention relates to stove-lids, and has for its object to provide a simple, durable, inexpensive, and efficient lid. To this end it consists in certain improvements in the construction and operation of the same.

Figure 1:
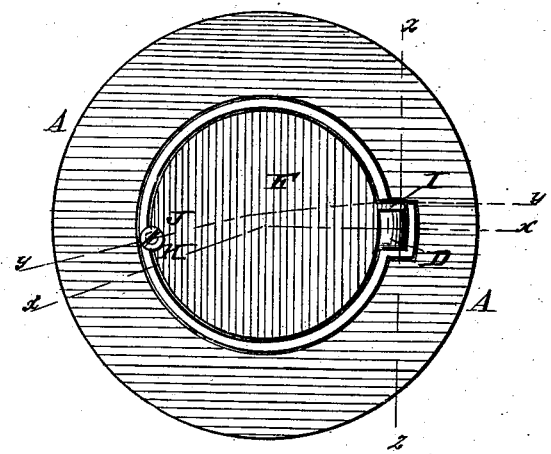
Figure 2:
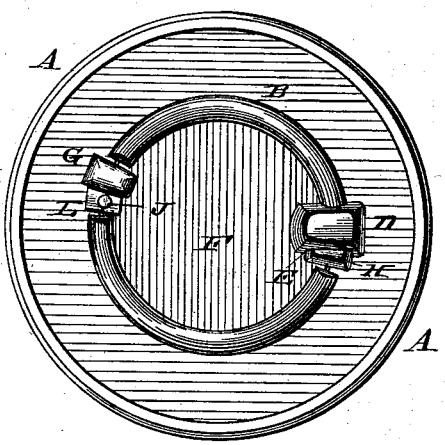
Figure 3:
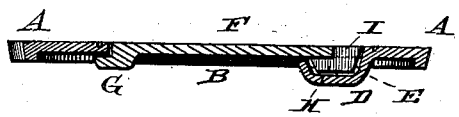
Figure 4:
Figure 5:
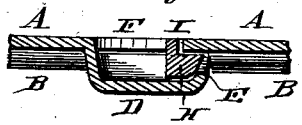
Figure 6:
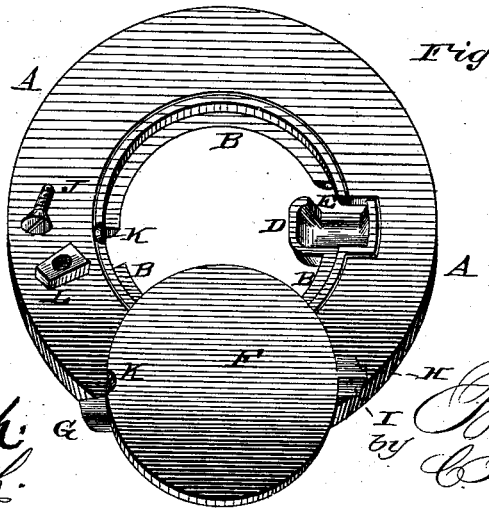

In the drawings, Figure 1 is a top view; Fig. 2, a bottom view; Fig. 3, a cross-section on the line $x\ x$, Fig. 1; Fig. 4, a like view on the line $y\ y$, Fig. 1; Fig. 5, a section on the line $z\ z$, Fig. 1; and Fig. 6, a perspective view of the parts detached.

Referring by letter to the drawings, A designates an outer annular plate or ring adapted to fit in an opening in the top of the stove, and provided around its inner edge with a shoulder, B, and a cup, D, one side of which is open, as at E.

F is a central plate or disk resting inside plate A on the shoulder B, and provided with lugs G H, projecting from its under surface. The former lug, G, enters under the edge of the ring A, while the latter, H, is dropped into the cup D and turned around through the open side thereof to close said opening, and is provided with an upturned flange, I, which engages the edge of plate A above the opening in the side of cup D, and thus limits the turning movement of the inner plate. The entire lid, comprising the two plates, can now be lifted by inserting the usual stove-handle in the cup D under the inner plate, and the weight is borne by the lugs; but to prevent the inner plate from turning and becoming separated from the outer plate, I provide a screw-bolt, J, inserted through a semicircular opening, K, in each plate at a point of juncture between the same, and having a nut, L, on its under side for securing it in position. At the same time, by removing the said bolt and nut the inner plate may be readily turned and withdrawn from the outer ring when desired or necessary.

The operation and advantages of my invention will be readily understood. The two plates can expand or contract independently of each other, thus preventing cracking or warping. The plates being secured together by lugs, instead of with bolts or rivets, as heretofore, great durability is obtained, as bolts or rivets soon burn out. Being of but one thickness, the plates are very light in weight, and more effective heating is secured. By fastening the center plate at its edge, in lieu of by cross-pieces supporting the same or extending to the middle thereof, there are no obstructions on the under surface of the plate, and it is completely and entirely exposed to the heat.

I am aware that the inner disks have been heretofore secured to the outer rings by lugs on the edges of the former, and also that the outer rings have been provided with a cup adapted to receive a lug on the inner plate, and such I do not claim broadly as of my invention.

I claim and desire to secure by Letters Patent—

1. The combination, with the outer ring or plate having a cup formed on its inner edge, provided with but a single open side, of the inner disk or plate provided with a lug adapted to be received into said cup, and provided with an upturned flange, which engages the edge of the outer plate above the opening in the cup to close the same, substantially as set forth.

2. The combination, with the outer annular plate or ring having a semicircular opening in its edge, and the central plate or disk having a corresponding semicircular opening, and provided with a lug adapted to be turned under the outer plate, of a bolt and nut, the former adapted to be inserted between the semicircular openings and act as a key to prevent turning of the inner plate, as set forth.

3. The combination, with the outer annular plate or ring having a shoulder around its inner edge, and a cup formed with one open side, of the central plate or disk resting on said shoulder, and secured to the outer plate by lugs on its under edge adapted to extend under the outer plate, and one adapted to enter the cup, and, as the inner plate is turned, pass through its open side and close the same, as set forth.

In testimony that I claim the foregoing as my own I have hereto affixed my signature in presence of two witnesses.

BERRY A. BAXTER.

Witnesses:
 JOHN E. ROGERS,
 THOMAS BONSALL.